(12) United States Patent
Hori et al.

(10) Patent No.: US 6,696,194 B1
(45) Date of Patent: Feb. 24, 2004

(54) POLYMER ELECTROLYTIC FUEL CELL

(75) Inventors: Yoshihiro Hori, Ikoma (JP); Takeshi Yonamine, Suita (JP); Osamu Sakai, Neyagawa (JP); Masato Hosaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 7 days.

(21) Appl. No.: 10/088,302

(22) PCT Filed: Oct. 10, 2000

(86) PCT No.: PCT/JP00/07036

§ 371 (c)(1), (2), (4) Date: Mar. 18, 2002

(87) PCT Pub. No.: WO01/28018

PCT Pub. Date: Apr. 19, 2001

(30) Foreign Application Priority Data

Oct. 14, 1999 (JP) .......................... 11-292025

(51) Int. Cl.$^7$ .............................................. H01M 02/00
(52) U.S. Cl. ............................. 429/34; 429/38; 429/30
(58) Field of Search ............................. 429/34, 30, 38; 427/115

(56) References Cited

U.S. PATENT DOCUMENTS 5,607,785 A * 3/1997 Tozawa et al. ............... 429/33
5,733,682 A * 3/1998 Quadakkers et al. ........ 429/210

FOREIGN PATENT DOCUMENTS

| | | | |
|---|---|---|---|
| CA | 2273619 | * 12/1999 | ............ H01M/2/16 |
| JP | 9-298064 | 11/1997 | |
| JP | 10-270062 | 10/1998 | |
| JP | 11-45727 | 2/1999 | |
| JP | 11126620 | * 5/1999 | ............ H01M/8/02 |
| JP | 11-126622 | 5/1999 | |
| JP | 11-162479 | 6/1999 | |
| JP | 11-219713 | 8/1999 | |
| JP | 11-273693 | 10/1999 | |
| JP | 2000-21420 | 1/2000 | |
| JP | 2000-100452 | 4/2000 | |

* cited by examiner

Primary Examiner—Stephen Kalafut
Assistant Examiner—Raymond Alejandro
(74) Attorney, Agent, or Firm—McDermott, Will & Emery

(57) ABSTRACT

A polymer electrolyte fuel cell including a hydrogen-ion-conductive polymer electrolyte membrane, a pair of electrodes sandwiching the membrane, a conductive separator plate having a gas passage for supplying a fuel to one of the electrodes, and a conductive separator plate having a gas passage for supplying an oxidant to the other electrode. The metallic conductive separator plate is a type in which a conductive coat including conductive particles and glass is formed on a surface having a gas passage. As a result, the corrosion of the metallic plate is suppressed and the degradation of the power generation efficiency after extended use is also suppressed.

11 Claims, 4 Drawing Sheets

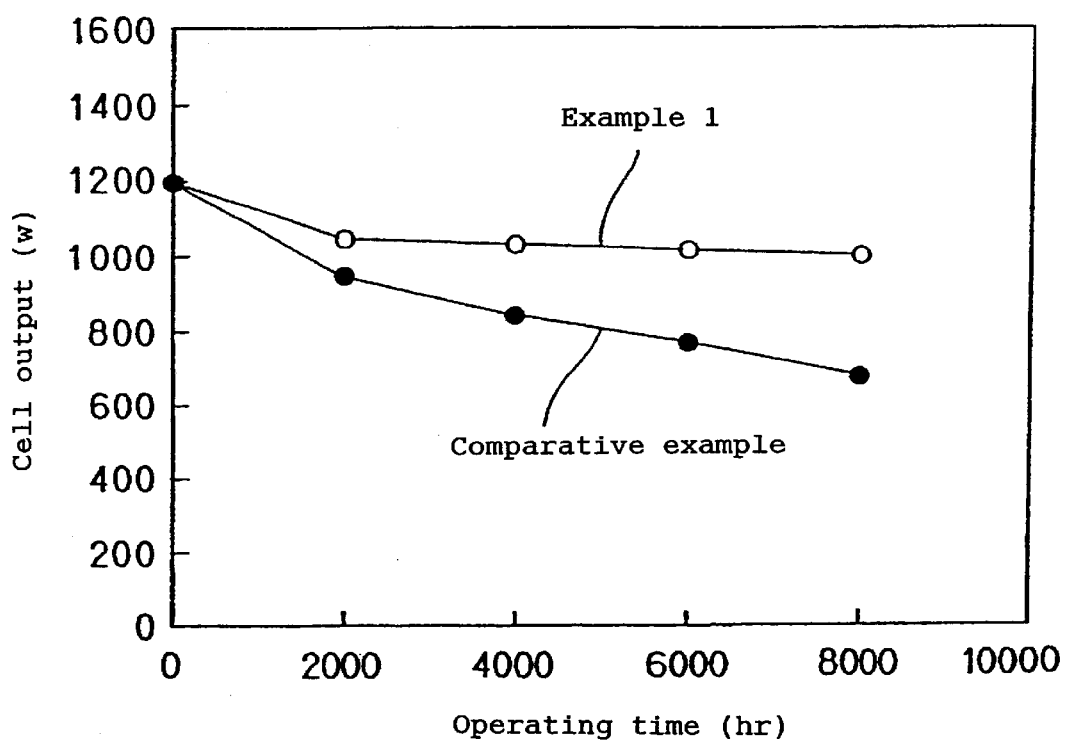

POLYMER ELECTROLYTIC FUEL CELL

TECHNICAL FIELD

The present invention relates to polymer electrolyte fuel cells used for portable power sources, electric vehicle power sources, domestic cogeneration systems, etc.

BACKGROUND ART

A fuel cell using a polymer electrolyte generates electric power and heat simultaneously by electrochemical reaction of a fuel gas containing hydrogen and a fuel gas containing oxygen such as air. This fuel cell is basically constructed by a pair of electrodes, namely, an anode and a cathode, formed on both surfaces of a polymer electrolyte membrane that selectively transports hydrogen ions. The above-mentioned electrode comprises a catalyst layer composed mainly of a carbon powder carrying a platinum group metal catalyst, and a diffusion layer which has both gas permeability and electronic conductivity and is formed on the outside surface of this catalyst layer.

Moreover, in order to prevent leakage of the fuel gas and oxidant gas supplied to the electrodes and prevent mixing of two kinds of gases, a gas sealing material and gaskets are arranged on the periphery of the electrodes with the polymer electrolyte membrane therebetween. These sealing material and gaskets are assembled into a single part together with the electrodes and polymer electrolyte membrane in advance. This part is called "MEA" (electrolyte membrane and electrode assembly). Disposed outside of the MEA are conductive separator plates for mechanically securing the MEA and for electrically connecting adjacent MEAs in series. A portion of the separator plate, which is in contact with the MEA, is provided with a gas passage for supplying a reacting gas to the electrode surface and for removing a generated gas and excess gas. Although the gas passage can be provided separately from the separator plate, it is usual to form a groove on a surface of each separator plate to serve as the gas passage.

In order to supply the fuel gas and oxidant gas to these grooves, it is necessary to branch pipes that supply the fuel gas and the oxidant gas, respectively, according to the number of separator plates to be used and to use piping jigs for connecting an end of the branch directly to the separator plate. This jig is called "manifold" and a type of manifold that directly connects the supply pipes of the fuel gas and oxidant gas to the grooves as mentioned above is called "external manifold". There is a type of manifold, called "internal manifold", with a more simple structure. The internal manifold is configured such that through holes are formed in the separator plates having gas passages and the inlet and outlet of the gas passages are extended to the holes so as to supply the fuel gas and oxidant gas directly from the holes.

Since the fuel cell generates heat during operation, it is necessary to cool the cell with cooling water or the like in order to keep the cell in good temperature conditions. In general, a cooling section for feeding the cooling water is provided for every one to three cells. There are a type in which the cooling section is inserted between the separator plates and a type in which a cooling water passage is provided in the rear surface of the separator plate so as to serve as the cooling section, and the latter type is often used. The structure of a common cell stack is such that these MEAs, separators and cooling sections are placed one upon another to form a stack of 10 to 200 cells, and this stack is sandwiched by end plates, with a current collector plate and an insulating plate between the stack and each end plate, and secured with clamping bolts from both sides.

In such a polymer electrolyte fuel cell, the separator plates need to have a high conductivity, high gas-tightness for the fuel gas and oxidant gas, and high corrosion resistance against a reaction of hydrogen/oxygen oxidation-reduction. For such reasons, a conventional separator plate is usually formed from carbon material such as glassy carbon and expanded graphite, and a gas passage is produced by cutting a surface of the separator plate, or by molding with a mold when the expanded graphite is used.

In a conventional method of cutting a carbon plate, it was difficult to reduce the cost of the material of the carbon plate and the cost of cutting the carbon plate. Besides, a method using expanded graphite also suffers from a high cost of material, and it has been considered that the high cost of material prevents a practical application of this method.

In resent years, attempts to use a metallic plate, such as stainless steel, in place of a conventionally used carbon material have been made.

However, in the above-mentioned method using a metallic plate, since the metallic plate is exposed to oxidizing atmosphere of the pH of around 2 to 3 at high temperatures, the corrosion and dissolution of the metallic plate will occur when used in a long time. The corrosion of the metallic plate increases the electrical resistance in the corroded portion and decreases the output of the cell. Moreover, when the metallic plate is dissolved, the dissolved metal ions diffuse in the polymer electrolyte and are trapped at the ion exchange site of the polymer electrolyte, resulting in a lowering of the ionic conductivity of the polymer electrolyte. For these causes, when a cell constructed by using a metallic plate as it is for a separator plate was operated for a long time, there was a problem of gradual lowering of the power generating efficiency.

DISCLOSURE OF INVENTION

An object of the present invention is to improve a separator plate for use in a fuel cell and provide a separator plate which is formed of a metal material that can be easily processed, prevented from corroding and dissolving to maintain chemical inactivity even when its surface to come in contact with a gas is exposed to acidic atmosphere and has good conductivity.

The present invention provides a polymer electrolyte fuel cell comprising: a hydrogen-ion-conductive polymer electrolyte membrane; a pair of electrodes sandwiching the hydrogen-ion-conductive polymer electrolyte membrane therebetween; a conductive separator plate having a gas passage for supplying a fuel to one of the electrodes; and a conductive separator plate having a gas passage for supplying an oxidant to the other electrode, wherein each of the conductive separator plates is formed of a metallic plate with a conductive coat comprising conductive particles and glass, formed on a surface having the gas passage.

The glass used here is preferably low-alkali glass. If high-alkali glass is used, alkali ions in the glass diffuse into the polymer electrolyte through water when the fuel cell generates power. Moreover, if the alkali ions are trapped at the ion exchange site of the polymer electrolyte, the ionic conductivity of the polymer electrolyte is lowered. Thus, if long-term stability is taken into consideration, it is preferred to select a glass composition containing almost no alkali components. Preferred low-alkali glass compositions are as follows.

| | |
|---|---|
| PbO | 35 to 50 wt % |
| SiO$_2$ | 40 to 50 wt % |
| B$_2$O$_3$ | 10 to 15 wt % |
| Al$_2$O$_3$ | 5 to 10 wt % |

As the conductive particles, it is possible to use metals such as Au, Pt. Rh and Pd; conductive inorganic oxides such as RuO$_2$; conductive inorganic nitrides such as TiN, ZrN and TaN; and conductive inorganic carbides such as TiC, WC and ZrC. Among them, RuO$_2$ is most preferred in terms of conductivity and costs.

The mixing ratio of the glass and conductive particles forming a coat on a surface of the metallic plate can vary depending on the types of conductive particles; if the adhesion strength and conductivity of the coat are taken into consideration, the mixing ratio is preferably within a range of 50 to 90 wt % of glass and 10 to 50 wt % of conductive particles, and more preferably within a range of 70 to 90 wt % of glass and 10 to 30 wt % of conductive particles. If the conductive particles are less than 10 wt %, a sufficient conductivity cannot be obtained; if the conductive particles exceed 50 wt %, the coat has poor adhesion and strength.

Next, as a method for coating the metallic plate with a mixture of conductive particles and glass frit, the mixture is prepared in the form of a sufficiently dispersed slurry, ink, paste or the like by using an organic binder or the like. As the organic binder, it is preferred to use a cellulose-based resin or acrylic-based resin so as to prevent remaining of decomposed residues after a heat treatment. Examples of the application method include a screen printing method, a doctor blade method, a drawing method, an offset printing method, a spraying method, and a dipping method.

An appropriate thickness of the conductive coat formed as described above is within a range of from 3 to 20 μm. If the conductive coat is thinner than 3 μm, it does not ensure a sufficient corrosion resistance of the base metal, and, if the conductive coat is thicker than 20 μm, the resistance is increased.

BRIEF DESCRIPTION OF DRAWINGS

FIG. 6 is a drawing showing the output characteristics of fuel cells of Example 1 of the present invention and a comparative example.

BEST MODE FOR CARRYING OUT THE INVENTION

Referring to FIG. 1 through FIG. 5, the following description will explain examples of the structure of a fuel cell of the present invention. The structural drawings used here are intended to facilitate understanding, and the relative sizes and positional relations of the respective elements are not necessarily exact.

Figure 1:
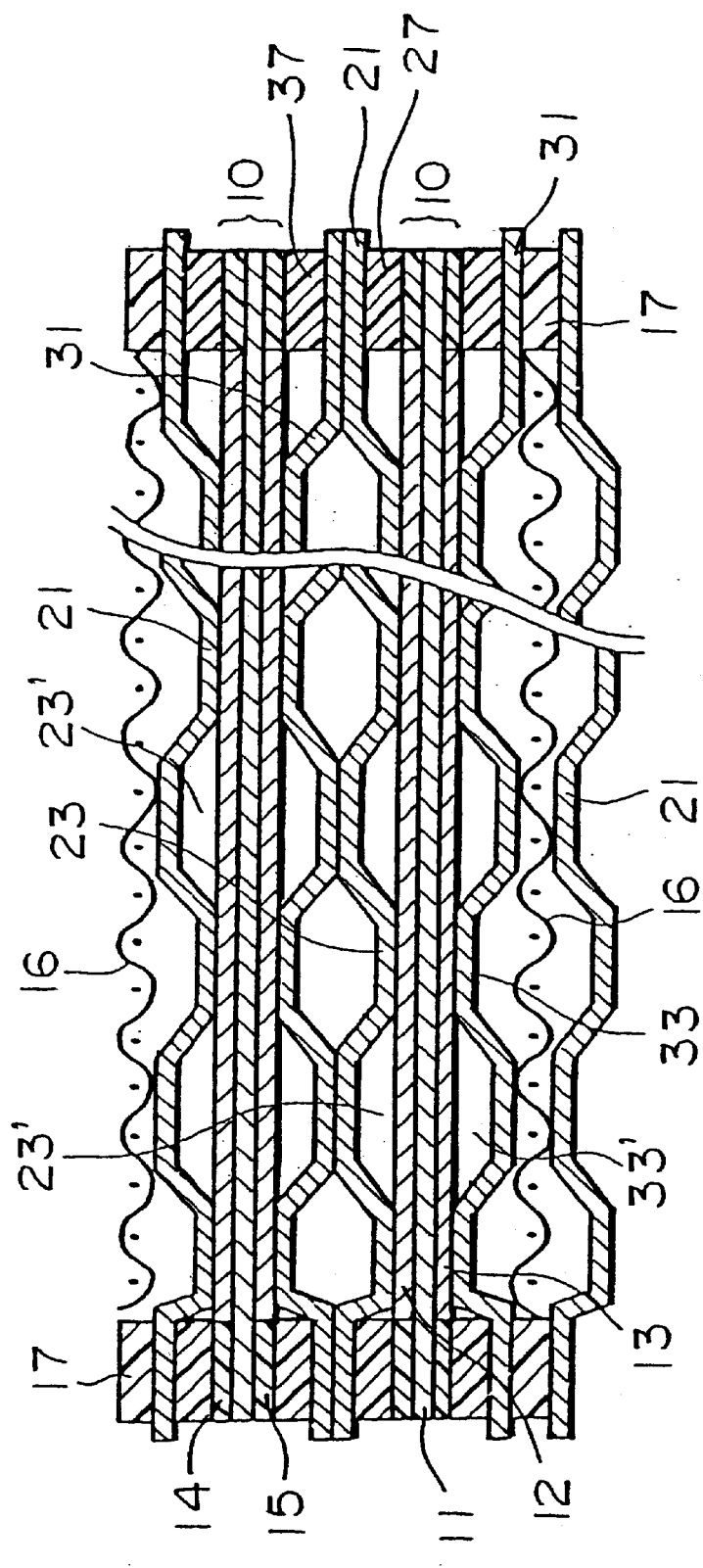
FIG. 1 is a cross sectional view depicting essential sections of a fuel cell according to an example of the present invention.
Figure 2:
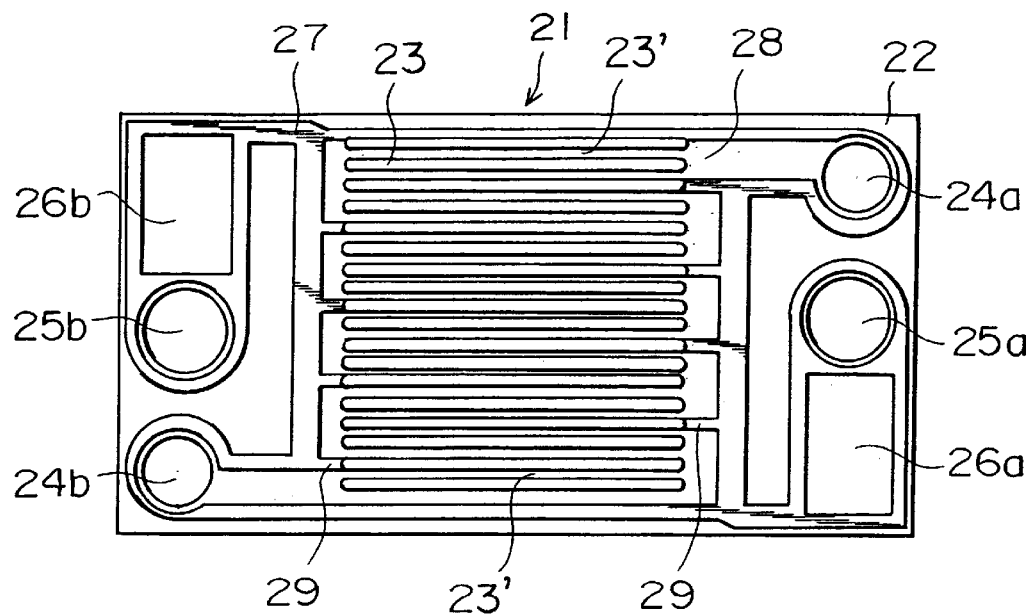
FIG. 2 is a plan view of an anode-side separator plate of the fuel cell.
Figure 3:
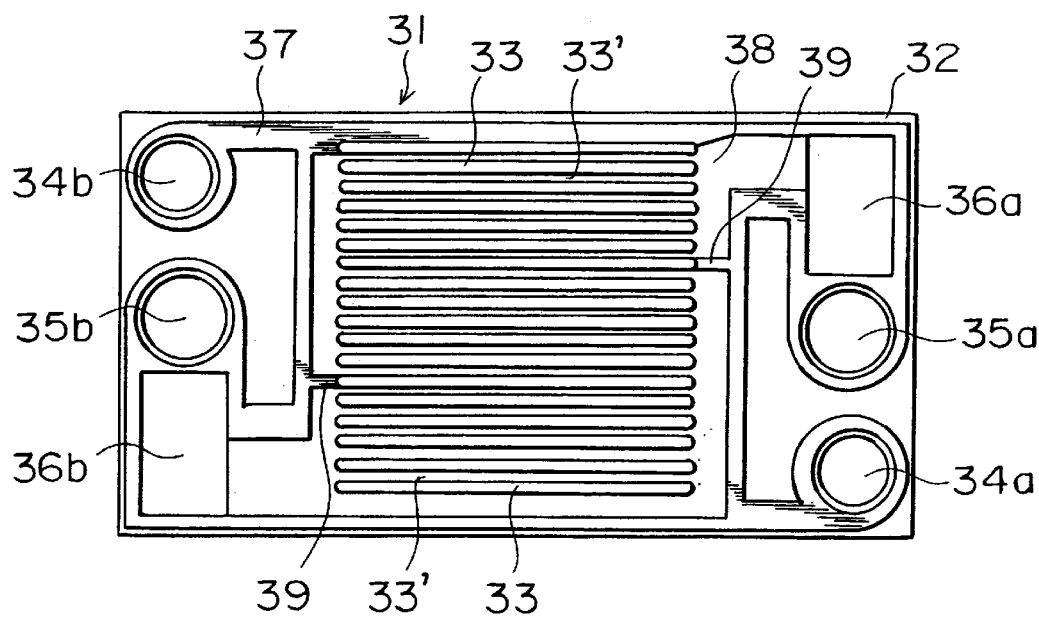
FIG. 3 is a plan view of a cathode-side separator plate of the fuel cell.

FIG. 1 is a cross sectional view depicting essential sections of a fuel cell stack, FIG. 2 is a plan view of its anode-side separator plate, and FIG. 3 is a plan view of its cathode-side separator plate.

10 represents an electrolyte membrane and electrode assembly (hereinafter referred to as "MEA") composed of a polymer electrolyte membrane 11, an anode 12 and a cathode 13 bonded to both surfaces of the polymer electrolyte membrane 11, gaskets 14 and 15 arranged on the peripheral portions thereof, etc. An anode-side separator plate 21 and a cathode-side separator plate 31 are disposed on the outside of the MEA. The MEA 10 and the separator plates 21 and 31 constitute a unit cell, and a plurality of such unit cells are stacked so that they are connected in series. In this example, a conductive metal mesh 16 and a gasket 17 are inserted between the separator plates 21 and 31 of every two cells so as to form a cooling section for passing cooling water.

Figure 4:
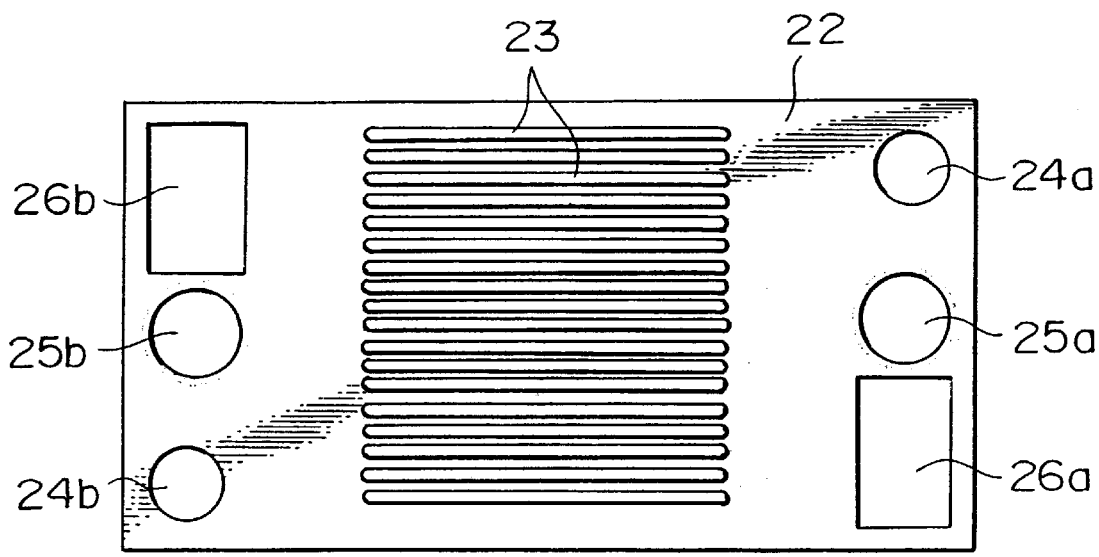
FIG. 4 is a plan view of a metallic plate constituting the anode-side separator plate.
Figure 5:
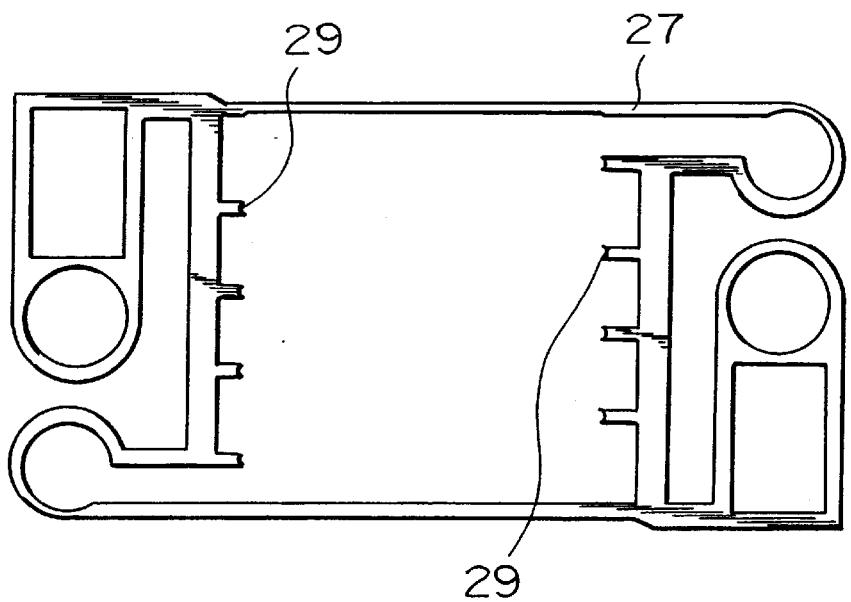
FIG. 5 is a plan view of an insulating sheet constituting the anode-side separator plate.

The anode-side separator plate 21 is constructed by sticking a metallic plate 22 shown in FIG. 4 and an insulating sheet 27 shown in FIG. 5 together. The metallic plate 22 has an array of protruding ribs 23 formed at the center of one major surface facing the anode by press working, and fluid inlet openings 24a, 25a, 26a and fluid outlet openings 24b, 25b, 26b on the right and left.

Meanwhile, when the insulating sheet 27 fabricated by stamping a sheet is stuck to a surface of the metallic plate 22 having the ribs 23, it forms a groove 28 for guiding a fluid, i.e., a fuel gas, from the fluid inlet opening 24a to the fluid outlet opening 24b, and, when the insulating sheet 27 is attached to the anode, it also functions as a gasket that prevents leakage of the fuel gas from the groove 28 and leakage of the fluid passing through the openings 25a, 25b and openings 26a, 26b.

The groove 28 formed on the surface of the separator plate 21 causes two grooves 23' formed on both sides of the ribs 23 by the assemblage of the ribs 23 of the metallic plate 22 and rib pieces 29 of the sheet 27 to pass the fuel gas.

As shown in FIG. 3, the cathode-side separator plate 31 is constructed by a metallic plate 32 having an array of protruding ribs 33 formed at the center of one major surface facing the cathode by press working and fluid inlet openings 34a, 35a, 36a and fluid outlet openings 34b, 35b, 36b on the right and left; and an insulating sheet 37 stuck to the surface of the metallic plate having the ribs 33. Formed on the surface of this cathode-side separator plate 31 facing the cathode is a groove 38 for guiding a fluid, i.e., an oxidant gas from the fluid inlet opening 36a to the fluid outlet opening 36b. Besides, the sheet 37 functions as a gasket for preventing the oxidant gas from leaking out of the groove 38 and for preventing the fluid passing through the openings 34a, 35a and openings 34b, 35b from leaking out.

The groove 38 causes four grooves 33' formed between the ribs 33 by the assemblage of the ribs 33 of the metallic plate 32 and rib pieces 39 of the sheet 37 to pass the oxidant gas.

Thus, if the separator plate is constructed by a combination of the metallic plate having a plurality of ribs formed by press working and the insulating sheet obtained by stamping, it is possible to vary the size of the fluid passage groove by only changing the form of the insulating sheet.

In the above-mentioned example, the cross-sectional area of the passage formed between the ribs 33 as a gas passage running to the groove 38 of the cathode-side separator plate 31 is three times the cross-sectional area of the passage formed between the ribs 23 as a gas passage running to the groove 28 of the anode-side separator plate 21. It is therefore possible to make the flow rate of the oxidant gas greater than that of the fuel gas.

In the above-mentioned example, while each of the anode-side conductive separator plate and the cathode-side separator plate is independently fabricated, it is also possible to construct the anode-side conductive separator plate and the cathode-side separator plate as one piece of separator plate so that one of the surfaces is an anode-side conductive separator plate and the other surface is a cathode-side conductive separator plate.

The following description will explain examples of the present invention, but the present invention is not limited only to these examples.

EXAMPLE 1

Platinum particles with an average particle diameter of about 30 angstroms were carried on an acetylene black-based carbon powder. The weight ratio of the carbon powder to platinum was 75:25. This catalyst powder was dispersed into isopropanol. A paste was formed by mixing this dispersion with an ethyl alcohol dispersion of perfluorocarbon sulfonic acid powder represented by the following formula:

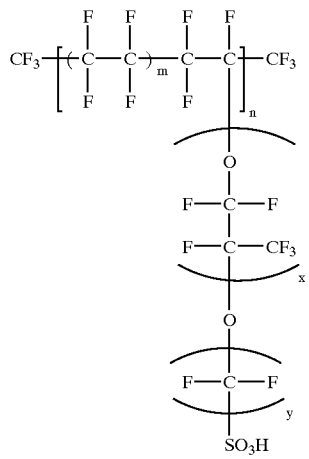

(where m=5 to 13, n≈1000, x=1, and y=2). This paste was printed on one of the surfaces of a 250 μm thick carbon nonwoven fabric by the screen printing method, and dried to form a catalyst layer.

Adjustments were made so that the amounts of platinum and perfluorocarbon sulfonic acid contained in the electrode thus formed were 0.5 mg/cm$^2$ and 1.2 mg/cm$^2$, respectively.

The above electrode was used for each of the anode and cathode. An MEA was fabricated by bonding these electrodes to both surfaces of the center part of a proton conductive polymer electrolyte membrane having an area slightly larger than the electrode by hot pressing so that the catalyst layer was in contact with the electrolyte membrane. The proton conductive polymer electrolyte used here was a 50 μm-thick thin film of perfluorocarbon sulfonic acid represented by the above-described formula (where m=5 to 13, n≈1000, x=2, and y=2).

Next, a process of fabricating a separator plate will be explained.

First, the ribs with a height of about 1 mm and a width of about 2.8 mm were formed at a pitch of 5.6 mm in a 10 cm×9 cm area at the center part of a 0.3 mm thick stainless steel SUS316 plate by press working. Thereafter, manifold apertures for supplying/discharging the fuel gas, cooling water and oxidant gas, respectively, were formed on both ends.

Next, after applying a degreasing treatment, the resulting plate was pickled with 10% aqua regia. Meanwhile, ruthenium oxide as conductive particles with an average particle diameter of 0.5 μm and glass frit made of 45 wt % PbO-45 wt % SiO$_2$-7.5 wt % B$_2$O$_3$-2.5 wt % Al$_2$O$_3$ with an average particle diameter of 1.0 μm were mixed in a weight ratio of 1:1, and pulverized/mixed using a ball mill. 20 parts by weight of an organic vehicle composed mainly of ethyl cellulose and α-terpineol was added to the mixture of the ruthenium oxide and glass, based on 100 parts by weight of the mixture. They were mixed in a mortar, and further mixed with three rollers for two hours to obtain a paste for coating the metallic plate. The paste viscosity was adjusted by suitably adding butylcarbitol acetate as a diluent in the mixing processes using the mortar and three rollers and in screen printing.

The resulting paste was applied to both surfaces of the metallic plate by the screen printing method. After drying, this metallic plate was baked at 700° C. to form a coat with a thickness of 4.0 μm.

By combining the metallic plate having the coats formed thereon with an insulating sheet 27 made of a phenol resin for the anode and an insulating sheet 37 made of a phenol resin for the cathode, the anode-side separator plate 21 and the cathode-side separator plate 31 as shown in FIG. 2 and FIG. 3 were fabricated.

It is clear from a comparison of FIG. 2 and FIG. 3 that the structures of the gas passages were varied by changing the configurations of the rib pieces 29 and 39 of the insulating sheets 27 and 37 to be combined with the metallic plates of the same structure. Accordingly, the flow rate of air flowing in the passage in the cathode-side conductive separator plate 31 can be made around 25 times greater than the flow rate of hydrogen flowing in the passage on the anode side. Thus, by changing the form of the insulating resin sheet according to the gas flow rate, it is possible to obtain an optimum gas flow rate and gas pressure loss.

These separator plates were combined with the above-mentioned MEAs to stack 50 cells, and the resulting cell stack was clamped via collector plates and insulating plates by stainless steel end plates and clamping rods with a pressure of 20 kgf/cm$^2$. The cell stack was provided with a passage of cooling water by inserting a metal mesh 16 formed of stainless steel SUS316 between the separator plates 21 and 31 of every two cells. Moreover, by applying grease thinly to portions needing gas seal, such as between the gasket and the MEA, between the separator plates and between the gasket and the separator plate, sealing properties were ensured without causing a significant lowering of the conductivity.

As a comparative example, a cell was assembled to have the same structure as that of Example 1 except that the conductive separators were formed of stainless steel SUS316 having no coat on its surfaces.

Polymer electrolyte fuel cells of Example 1 and the comparative example were held at 85° C., and a hydrogen gas which was humidified and heated to a dew point of 83° C. was supplied to the anode, while the air which was humidified and heated to a dew point of 78° C. was supplied to the cathode. As a result, an open circuit voltage of 50V was exhibited in a no-load condition in which a current was not output.

These cells were subjected to a continuous power generation test under the conditions of a fuel utilization ratio of 80%, an oxygen utilization ratio of 40% and a current density of 0.5 A/cm$^2$, and the changes of their output characteristics with time are shown in FIG. 6. As a result, the output of the cell of the comparative example was lowered with the operating time, while the cell of Example 1 kept the cell output of 1000 W (22 V–45 A) over 8000 hours.

EXAMPLE 2

First, a 0.3 mm thick stainless steel SUS316 plate was subjected to a surface treatment using a sand blast device. Next, in the same manner as in Example 1, ribs were formed by press working, and further manifold apertures were formed. Meanwhile, for an ink, gold particles as conductive particles with an average particle diameter of 0.3 $\mu$m and glass frit made of 45 wt % PbO-45 wt % $SiO_2$-7.5 wt % $B_2O_3$-2.5 wt % $Al_2O_3$ with an average particle diameter of 0.3 $\mu$m were mixed in a weight ratio of 20:1, and pulverized/mixed using a ball mill. 5 parts by weight of an organic vehicle composed mainly of ethyl cellulose and $\alpha$-terpineol was added to the mixture of the gold particles and glass, based on 100 parts by weight of the mixture. They were mixed using a mortar and three rollers for two hours. Next, butyl acetate in an amount of 10 to 20 times more than the mixture of the gold particles and glass in the weight ratio was added to the mixture while stirring them to prepare the ink for coating the metallic plate. This ink was applied to both surfaces of the metallic plate by the doctor blade method. After drying, this metallic plate was baked at 650° C. to form a coat with a thickness of 3.0 $\mu$m.

With the use of the conductive separator plates thus fabricated, a cell stack similar to Example 1 was assembled and subjected to a continuous power generation test in the same conditions as in Example 1. The outputs of this cell at an initial stage (10 hours later from the start of operation) and upon passage of 8000 hours of the operating time are shown in Table 1 in comparison with the cells of Example 1 and comparative example.

TABLE 1

| | Output/W | | |
| --- | --- | --- | --- |
| | Initial stage | 2000 hours later | 8000 hours later |
| Example 1 | 1200 | 1050 | 1000 |
| Example 2 | 1150 | 1000 | 950 |
| Comparative Example | 1200 | 1000 | 680 |

It is clear from Table 1 that the cell of Example 2 also has excellent characteristics like the cell of Example 1.

Industrial Applicability

According to the present invention, in place of a conventional method of cutting a carbon plate, since the separator plate can be formed without cutting a metal material such as stainless steel, it is possible to achieve a significant reduction in the costs. Moreover, since the separator plate can be made thinner, it contributes to the realization of a compact cell stack.

What is claimed is:

1. A polymer electrolyte fuel cell comprising: a hydrogen-ion-conductive-polymer electrolyte membrane; a pair of electrodes sandwiching said hydrogen-ion-conductive polymer electrolyte membrane; a first conductive separator plate having a gas passage for supplying a fuel to one of said electrodes; and a second conductive separator plate having a gas passage for supplying an oxidant to the other electrodes, characterized in that each of said first and second conductive separators is formed of a metallic plate with a conductive coat comprising conductive particles and glass, formed on a surface having said passage.

2. The polymer electrolyte fuel cell as set forth in claim 1, wherein said conductive coat has a thickness in the range of 3 to 20 um.

3. The polymer electrolyte fuel cell as set forth in claim 1, wherein said metallic plate is stainless steel.

4. The A polymer electrolyte fuel cell comprising: a hydrogen-ion-conductive polymer electrolyte membrane; a pair of electrodes sandwiching said hydrogen-ion-conductive polymer electrolyte membrane; a first conductive separator plate having a gas passage for supplying a fuel to one of said electrodes; and a second conductive separator plate having a gas passage for supplying an oxidant to the other electrodes, characterized in that each of said first and second conductive separators is formed of a metallic plate with a conductive coat comprising conductive particles and glass, formed on a surface having said passage, wherein the glass forming said conductive coat is a low-alkali glass.

5. The polymer electrolyte fuel cell as set forth in claim 4, wherein said conductive particles are selected from the group consisting of Au, Pt, Rh, Pd, TiN, ZrN, TaN, TiC, WC, ZrC and $RuO_2$.

6. The polymer electrolyte fuel cell as set forth in claim 4, wherein said conductive coat is composed to 50 to 90 wt % of low-alkali glass and 10 to 50 wt % of conductive particles.

7. The polymer electrolyte fuel cell as set forth in claim 4, wherein said conductive coat has a thickness in the range of 3 to 20 um.

8. The polymer electrolyte fuel cell as set forth in claim 4, wherein said metallic plate is stainless steel.

9. The A polymer electrolyte fuel cell comprising: a hydrogen-ion-conductive polymer electrolyte membrane; a pair of electrodes sandwiching said hydrogen-ion-conductive polymer electrolyte membrane; a first conductive separator plate having a gas passage for supplying a fuel to one of said electrodes; and a second conductive separator plate having a gas passage for supplying an oxidant to the other electrodes, characterized in that each of said first and second conductive separators is formed of a metallic plate with a conductive coat comprising conductive particles and glass, formed on a surface having said passage, wherein said glass forming said conductive coat is low-alkali glass, and wherein said low-alkali glass is composed of 35 to 50 wt % of PbO, 40 to 50 wt % of $SiO_2$, 10 to 15 wt % of $B_2O_3$, and 5 to 10 wt % of $Al_2O_3$.

10. The polymer electrolyte fuel cell as set forth in claim 9, wherein said conductive coat has a thickness in the range of 3 to 20 um.

11. The polymer electrolyte fuel cell as set forth in claim 9, wherein said metallic plate is stainless steel.

* * * * *